(12) United States Patent
Gross (10) Patent No.: US 9,806,507 B2
(45) Date of Patent: Oct. 31, 2017

(54) MODULAR ELECTRICAL BOX EXTENDER

(71) Applicant: Phillip J. Gross, Leesville, SC (US)

(72) Inventor: Phillip J. Gross, Leesville, SC (US)

( * ) Notice: Subject to any disclaimer, the term of this patent is extended or adjusted under 35 U.S.C. 154(b) by 102 days.

(21) Appl. No.: 14/816,416

(22) Filed: Aug. 3, 2015

(65) Prior Publication Data

US 2017/0040786 A1    Feb. 9, 2017

(51) Int. Cl.
*H02G 3/08* (2006.01)
*H02G 3/10* (2006.01)
*H02G 3/12* (2006.01)

(52) U.S. Cl.
CPC .......... *H02G 3/086* (2013.01); *H02G 3/08* (2013.01); *H02G 3/081* (2013.01); *H02G 3/10* (2013.01); *H02G 3/123* (2013.01)

(58) Field of Classification Search
CPC .......... H02G 3/081; H02G 3/10; H02G 3/123; H02G 3/08; H02G 3/086
USPC ...... 220/3.2, 3.5, 3.7, 3.94, 4.01, 4.02, 4.03, 220/3.92; 174/50, 480, 481
See application file for complete search history.

(56) References Cited

U.S. PATENT DOCUMENTS

| | | | |
|---|---|---|---|
| 3,115,265 A * | 12/1963 | Mulkey | H02G 3/123 220/3.5 |
| 4,634,015 A | 1/1987 | Taylor | |
| 5,042,673 A | 8/1991 | McShane | |
| 5,117,996 A | 6/1992 | McShane | |
| 5,289,934 A | 3/1994 | Smith et al. | |
| 5,293,003 A | 3/1994 | Prairie, Jr. | |
| 5,402,902 A | 4/1995 | Bouley | |
| 5,596,174 A | 1/1997 | Sapienza | |
| 5,619,013 A * | 4/1997 | Jorgensen | H02G 3/086 174/53 |
| 5,853,098 A * | 12/1998 | Elder | H02G 3/086 220/3.3 |
| 7,273,982 B1 | 9/2007 | Lalancette | |
| 7,276,661 B2 | 10/2007 | Wegner et al. | |
| 7,531,743 B2 | 5/2009 | Johnson et al. | |
| 7,637,385 B2 | 12/2009 | Wegner et al. | |
| 7,757,875 B2 | 7/2010 | Lalancette et al. | |

* cited by examiner

*Primary Examiner* — Fenn C Mathew
*Assistant Examiner* — Elizabeth Volz
(74) *Attorney, Agent, or Firm* — Dority & Manning, P.A.

(57) ABSTRACT

An electrical box extender generally including a first half and a second half is provided. The first and second halves each extend between a male end and a female end. When attached, the first and second halves together form a polygon shape having four corners. One corner is formed where the male end of the first half is attached to the female end of the second half and another corner is formed where the male end of the second half is attached to the female end of the first half. Such an electrical box extender may allow for easier installation to electrical box having existing electrical connections.

18 Claims, 6 Drawing Sheets

MODULAR ELECTRICAL BOX EXTENDER

FIELD OF THE INVENTION

The present subject matter relates generally to a multiple-piece extension for an electrical box.

BACKGROUND OF THE INVENTION

Industrial electrical boxes are widely used in industrial construction and may be mounted to, e.g., walls, ceilings, and/or floors. Typical industrial electrical boxes include a backplate, four walls extending perpendicularly from such backplate, and an open face. Conduits housing one or more electrical wires may be mounted to one or more of the four walls. The one or more electrical wires may extend through the industrial electrical box to another conduit, or alternatively may be attached to an electrical device mounted over the open face. For example, in certain applications, one or more electrical power lines extend through a conduit attached to one of the four walls of the electrical box and attach to an electrical outlet mounted over the open face of the electrical box. Similarly, in other applications, network connection lines extend through a conduit attached to one of the four walls of the electrical box and attach to a network connection device mounted over the open face of the electrical box.

Certain building codes generally provide that no more than a predetermined amount of electrical wires may be present in an electrical box of a certain size. Accordingly, if making modifications to an electrical system of a building includes adding more than the predetermined amount of electrical wires to the electrical box, the electrical box must be extended in size to accommodate such additional electrical wires. Typically, this is accomplished by disconnecting all electrical connections made to any electrical devices mounted over the open face of the electrical box, disconnecting all such electrical devices, mounting a single-piece box extension to the electrical box, mounting all such electrical devices to the box extension, and then reconnecting the electrical connections to the electrical devices.

However, in certain instances, such as when one or more network connection lines are connected to a network connection device mounted over the open face of the electrical box, disconnecting such network connection lines from the network connection device can cause significant interruptions. For example, when a company's server is connected to the company's network through the network connection device, significant interruption may be caused to the business by disconnecting the one or more network connection lines from the network connection device. Accordingly, an electrical box extension device that allows for extending a depth of an electrical box without requiring the electrical connections made over an open face of the electrical box to be disconnected would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an electrical box extender is provided configured for attachment to an underlying electrical box. The electrical box extender includes a first half extending between a male end and a female end, and a second half also extending between a male end and a female end. The first and second halves together form a polygonal shape having four corners. One corner is formed where the male end of the first half is attached to the female end of the second half, and another corner is formed where the male end of the second half is attached to the female end of the first half.

In another exemplary embodiment of the present disclosure, an electrical box assembly defining a transverse direction is provided. The electrical box assembly includes an electrical box having a polygonal shaped configured to receive a plurality of electrical wires and configured for attachment to a wall. The electrical box defines an outer edge along the transverse direction. The electric box assembly also includes an electrical box extender attached to the electrical box and positioned at the outer edge of the electrical box. The electrical box extender includes a first half extending between a male end and a female end, and a second half also extending between a male end and a female end. The first and second halves together form a polygonal shape substantially the same as the polygonal shape of the electrical box and having four corners. One corner is formed where the male end of the first half is attached to the female end of the second half, and another corner is formed where the male end of the second half is attached to the female end of the first half.

In yet another exemplary embodiment of the present disclosure, an electrical box extender is provided defining a transverse direction and configured for attachment to an underlying electrical box. The electrical box extender includes a first half formed integrally of metal and extending continuously between a male end and a female end. The electrical box extender also includes a second half interchangeable with the first half and also formed integrally of metal and extending continuously between a male end and a female end. The first and second halves together form a polygonal shape having four corners. One corner is formed where the male end of the first half is attached to the female end of the second half by a screw extending along the transverse direction. Another corner is formed where the male end of the second half is attached to the female end of the first half by a screw extending along the transverse direction. The screw attaching the male end of the first half to the female end of the second half and the screw attaching the male end of the second half to the female end of the first half are each configured to attach the electrical box extender to the underlying electrical box.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Figure 1:
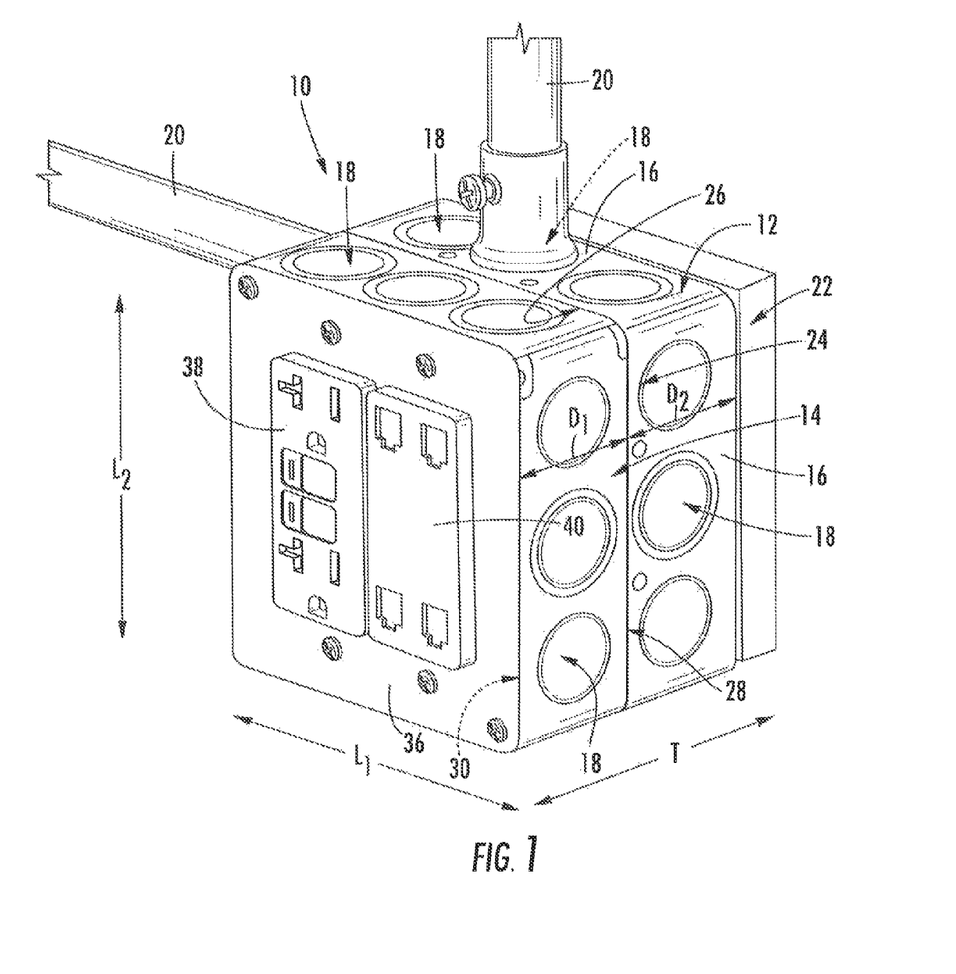
FIG. 1 is a perspective view of an electrical box assembly including an electrical box extender in accordance with an exemplary embodiment of the present disclosure.

Referring now to the drawings, wherein identical numerals indicate the same elements throughout the figures, FIG. 1 is perspective view of an electrical box assembly 10 including an underlying electrical box 12 having an electrical box extender 14 in accordance with an exemplary embodiment of the present disclosure attached thereto. The exemplary electrical box extender 14 and underlying electrical box 12 define a lateral direction $L_1$, a longitudinal direction $L_2$, and a transverse direction T. The lateral, longitudinal, and transverse directions $L_1$, $L_2$, T are each orthogonal to one another.

The underlying electrical box 12 generally includes a backplate (not shown) and four walls 16 extending perpendicularly from the backplate, such that the underlying electrical box 12 has a polygon shape. More particularly, for the embodiment depicted, the underlying electrical box 12 has a squared shape with four corners, the box 12 measuring approximately four inches by four inches. However, in other embodiments, the underlying electrical box 12 may instead have a rectangular shape measuring approximately two inches by four inches, approximately four and eleven sixteenths inches ($4^{11}/_{16}$″) by four and eleven sixteenths inches ($4^{11}/_{16}$″), or any other suitable shape.

As shown, the electrical box 12 is configured to receive a plurality of electrical wires. More specifically, each of the four walls 16 include knockout openings 18, i.e., circular portions which may be removed for mounting an electrical conduit 20 housing one or more electrical wires. Additionally, for the embodiment depicted, the electrical box extender 14 similarly includes a plurality of knockout openings 18 for receipt of one or more electrical wires. The underlying electrical box 12 extends along the transverse direction T between an inner end 22 and an outer end 24. The backplate is positioned at the inner end 22, and an outer edge 26 is defined by the electrical box 12 at the outer end 24. For the embodiment depicted, the electrical box 12 is mounted to a surface by attaching the backplate 36 to such surface. For example, the surface may be a wall, a floor, etc.

The exemplary electrical box extender 14 is attached to the electrical box 12 and positioned at the outer edge 26 of the electrical box 12. More particularly, the exemplary electrical box extender 14 extends along the transverse direction T between an inner edge 28 and an outer edge 30. The inner edge 28 of the electrical box extender 14 is positioned flush with the outer edge 26 of the electrical box 12. As will be described in greater detail below with reference to FIGS. 2 and 3, the exemplary electrical box extender 14 generally includes a first half 32 and a second half 34 together defining a polygonal shape substantially the same as the polygonal shape of the underlying electrical box 12. More particularly, for the embodiment depicted, the first and second halves 32, 34 together form a square shape measuring approximately four inches by four inches. As is depicted, the exemplary electrical box 12 defines a depth $D_1$ along the transverse direction T substantially the same as a depth $D_2$ of the underlying electrical box 12. For example, the depths $D_1$ and $D_2$ may each be approximately one and one fourth of an inch (1¼″) deep, one and one half of an inch (1½″) deep, two and one eighth of an inch (2⅛″) deep, or any other suitable depth. Accordingly, attaching the exemplary electrical box extender 14 to the underlying electrical box 12 approximately doubles a usable volume of the electrical box assembly 10.

Moreover, for the embodiment depicted, a plate 36 is attached to the electrical box extender 14 and positioned adjacent to the outer edge 30 of the electrical box extender 14. The plate 36 includes an electrical power outlet device 38 and a network connection device 40 attached thereto. For example, a plurality of electrical power lines may run through one or both of the conduits 20 for attachment to the electrical power outlet device 38, and a plurality of network connection lines may extend through one or both of the conduits 20 for attachment to the network connection device 40. For example, in certain exemplary embodiments, the network connection lines may be, e.g., Ethernet lines, phone lines, etc., and one or more Ethernet cords and/or phone cords may be attached to the network connection device 40 to connect to the respective network connection lines.

Figure 2:
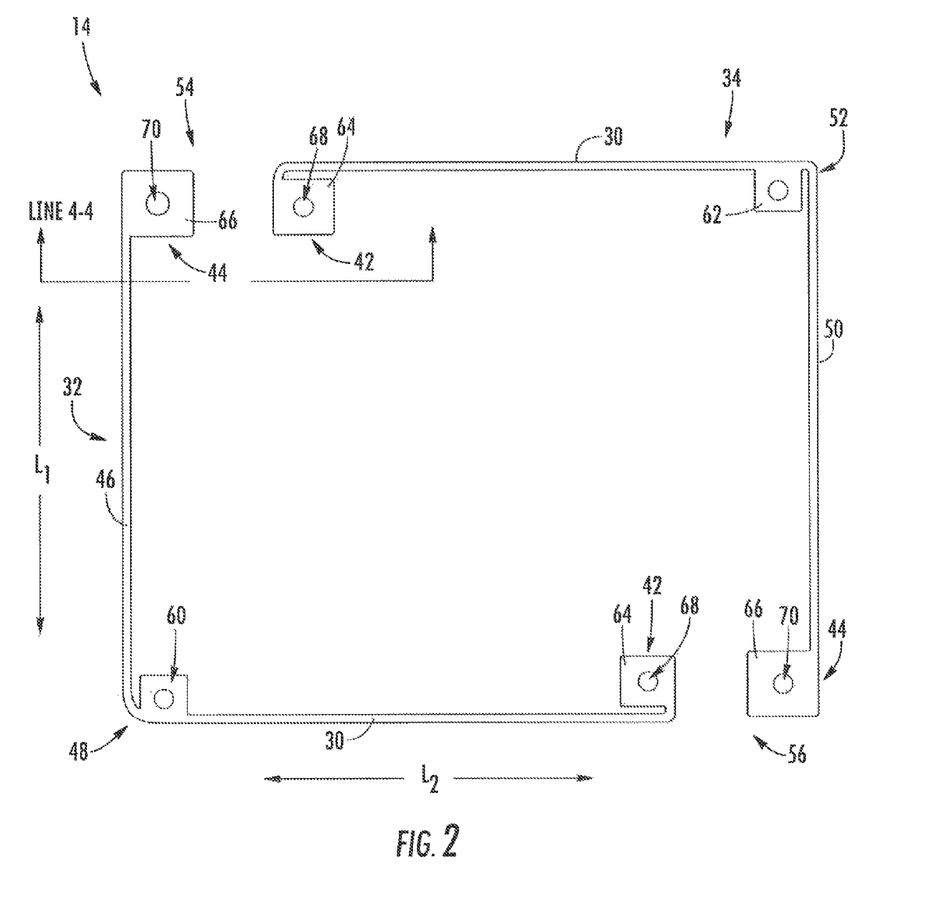
FIG. 2 is a top, exploded view of the exemplary electrical box extender of FIG. 1.
Figure 3:
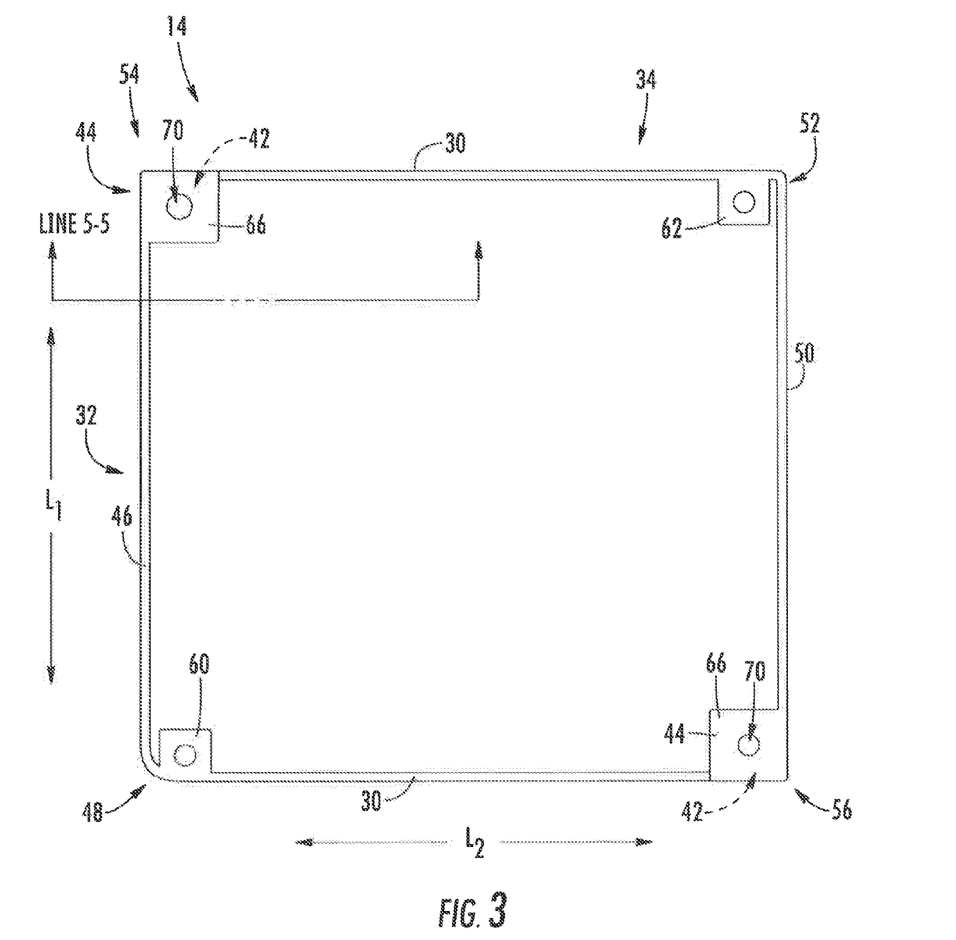
FIG. 3 is a top, attached view of the exemplary electrical box extender of FIG. 1.

With reference now to FIGS. 2 and 3, the exemplary electrical box extender 14 of FIG. 1 will be described in greater detail. FIG. 2 provides an exploded top view of the first half 32 and the second half 34 of the exemplary electrical box extender 14 of FIG. 1, and FIG. 3 provides an attached top view of the first half 32 and the second half 34 of the exemplary electrical box extender 14 of FIG. 1.

As shown, the first half 32 extends continuously between a male end 42 and a female end 44, and the second half 34 similarly extends continuously between a male end 42 and a female end 44. More specifically, the first half 32 includes a single first half wall 46 defining a substantially ninety degree (90°) bend, referred to herein as a first half corner 48, between the male end 42 and female end 44. The first half wall 46 extends in the transverse and longitudinal directions T, $L_2$ between the male end 42 and the first half corner 48, and extends in the transverse and lateral directions T, $L_1$ between the first half corner 48 and the female end 44. Similarly, the second half 34 includes a single second half wall 50 defining a substantially ninety degree (90°) bend, referred to herein as a second half corner 52, between the male end 42 and female end 44. The second half wall 50 extends in the transverse and longitudinal directions T, $L_2$ between the male end 42 and the second half corner 52, and extends in the transverse and lateral directions T, $L_1$ between the second half corner 52 and female end 44.

As shown most clearly in FIG. 3, once attached, the first and second halves 32, 34 together form a polygonal shape, which for the embodiment depicted is a squared shape, having four corners. A first attachment corner 54 is formed where the male end 42 of the second half 34 is attached to the female end 44 of the first half 32, and a second attachment corner 56, opposite the first attachment corner 54, is formed where the male end 42 of the first half 32 is attached to the female end 44 of the second half 34. As will be discussed below, a first attachment screw 58 (see FIG. 5) may be used to attach the male end 42 of the second half 34 to the female end 44 of the first half 32, and a second attachment screw (not shown) may be used to attach the male end 42 the first half 32 to the female end 44 of the second half 34.

Referring still to FIGS. 2 and 3, the first half 32 additionally includes an outer tab 60 extending inward from the first half corner 48 at the outside edge 30 of the first half 32. Similarly, the second half 34 also includes an outer tab 62 extending inward from the second half corner 52 at the outside edge 30 of the second half 34. The outer tabs 60, 62 of the first and second halves 32, 34, respectively, are each configured to allow for attachment of at least one of an additional electrical box extender, a blank cover plate, or a device.

Figure 4:
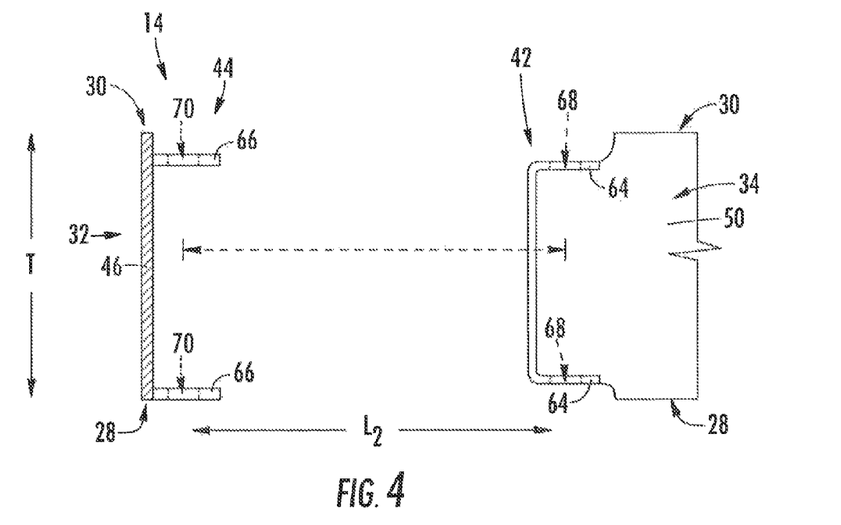
FIG. 4 is a side, cross-sectional, exploded view of the electrical box extender of FIG. 1, taken along Line 4-4 of FIG. 2.
Figure 5:
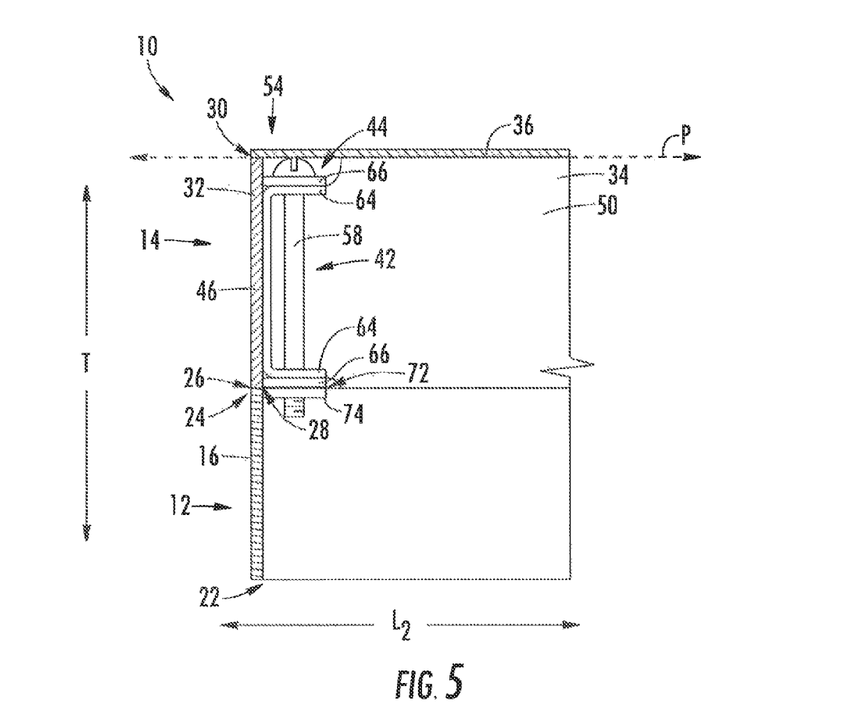
FIG. 5 is a side, cross-sectional, attached view of electrical box extender of FIG. 1, taken along Line 5-5 of FIG. 3.

Referring now to FIGS. 4 and 5, cross-sectional views of the exemplary electrical box extender 14 of FIG. 1 are provided. More particularly, FIG. 4 provides a cross-sectional, exploded view of the female end 44 of the first half 32 and the male end 42 of the second half 34, taken along Line 4-4 in FIG. 2, and FIG. 5 provides a cross-sectional, attached view of the female end 44 of the first half 32 and the male end 42 of the second half 34, taken along Line 5-5 in FIG. 3.

As shown, the male end 42 of the first half 32 includes a pair of tabs 64 extending perpendicularly from the first half wall 46. Similarly, the female end 44 of the second half 34 includes a pair of tabs 66 extending perpendicularly from the second half wall 50. The tabs 66 of the female end 44 of the first half 32 and the tabs 64 of the male end 42 of the second half 34 are each spaced along the transverse direction T, such that the tabs 64 of the male end 42 of the second half 34 are received within, and positioned inside, the tabs 66 of the female end 44 of the first half 32 when attached.

Additionally, for the embodiment depicted, the female end 44 of the first half 32 is attached to the male end 42 of the second half 34 using a first attachment screw 58 (FIG. 5) extending along the transverse direction T. More particularly, the tabs 64 of the male end 42 of the second half 34 each define an opening 68 and the tabs 66 of the female end 44 of the first half 32 also each define an opening 70. To attach the first and second halves 32, 34, the openings 68 in the tabs 64 of the male end 42 of the second half 34 are aligned with the openings 70 in the tabs 66 of the female end 44 of the first half 32 (FIG. 5). The first attachment screw 58 is then extended along the transverse direction T through the openings 70 in the tabs 66 of the female end 44 of the first half 32 and through the openings 68 in the tabs 64 of the male end 42 of the second half 34 to attach the first half 32 to the second half 34.

As may be seen most clearly in FIG. 5, the first attachment screw 58 attaching the female end 44 of the first half 32 to the male end 42 of the second half 34 is also configured to attach the electrical box extender 14 to the underlying electrical box 12. More particularly, for the embodiment depicted, a threaded portion 72 of the screw 58 extends along the transverse direction T through the openings 68, 70 in the tabs 64, 66 of the male end 42 of the second half 34 and the female end 44 of the first half 32, and past the inside edge 28 of the electrical box extender 14. The threaded portion 72 of the screw 58 may be screwed into a tab 74 of the underlying electrical box 12, affixing the electrical box extender 14 to the underlying electrical box 12. Notably, with such a configuration, the openings 68, 70 in the tabs 64, 66 are non-threaded opening, and the threaded portion 72 of the screw 58 does not rotatably engage with the openings 68, 70.

Referring still to FIGS. 4 and 5, the first and second halves 32, 34 additionally define an outer plane P at the outer edges 30. The tabs 66 of the female end 44 of the first half 32 are set back from the outer plane P such that the first attachment screw 58, extending through the openings 70 in the tabs 66 of the female end 44 of the first half 32 and through the openings 68 in the tabs 64 of the male end 42 of the second half 34, does not extend into or through the outer plane P. Such a configuration may allow for a blank cover or other device to be mounted flush to the outer edges 30 of the first and second halves 32, 34 of the electrical box extender 14. For example, in the embodiment of FIG. 5, the cover plate 36 is attached to the electrical box extender 14, mounted flush to the outer edges 30 of the first and second halves 32, 34.

Additionally, although not depicted in FIGS. 4 and 5, the male end 42 of the first half 32 may be attached to the female end 44 of the second half 34 in substantially the same manner as described above. For example, the male end 42 of the first half 32 may be attached the female end 44 of the second half 34 using a second attachment screw extending along the transverse direction T, the second attachment screw extending through openings 68 in tabs 64 of the male end 42 of the first half 32 and through openings 70 in tabs 66 of the female end 44 of the second half 34. Moreover, the second attachment screw, attaching the male end 42 of the first half 32 to the female end 44 of the second half 34, may also be configured to attach the electrical box extender 14 to the underlying electrical box 12 in the same manner that the first attachment screw 58 described above attaches the electrical box extender 14 to the underlying electrical box 12. Further, the tabs 66 of the female end 44 of the second half 34 may be set back from the outer plane P defined by the first and second halves 32, 34 in the same manner that the tabs 66 of the female end 44 of the first half 32 are set back from the outer plane P defined by the first and second halves 32, 34.

In certain exemplary embodiments, the first half 32 may be formed integrally of a metal material and the second half 34 may also be formed integrally of a metal material. For example, the first and second halves 32, 34 may be stamped sheet metal, or may be molded in its desired shape. Additionally, in certain embodiments, the metal material may be an aluminum material, a stainless steel material, or any other suitable material. Alternatively, in still other embodiments, the first and second halves 32, 34 may instead be formed integrally of a suitable plastic material, such as a polyvinyl chloride (PVC), acrylonitrile butadiene styrene (ABS), etc.

Moreover, for the embodiment depicted, the first half 32 is interchangeable with the second half 34. More specifically, the first half 32 makes up about half of the electrical box extender 14 and the second half 34 also makes up about half of the electrical box extender 14. Further, for the embodiment depicted, the first half 32 has substantially the same geometry as the second half 34, such that there substantially no differences between the first half 32 and the second half 34 other than orientation.

The exemplary electrical box extender 14 of FIGS. 1 through 5 may be attached to an underlying electrical box 12 without disconnecting any electrical connections made to an electrical device attached to the electrical box 12. For example, in certain exemplary aspects, a method for installing the exemplary electrical box extender 14 of FIGS. 1 through 5 may first include detaching the electrical device attached to the underlying electrical box 12. Notably, however, any electrical connections made through the underlying electrical box 12 to the electrical device need not be disconnected. Subsequently, the male end 42 of the second half 34 may be positioned adjacent to the female end 44 of the first half 32, such that the tabs 64 of the male end 42 of the second half 34 extend into the tabs 66 of the female end 44 of the first half 32. The first attachment screw 58 may then be extended through the openings 68 in the tabs 64 of the male end 42 of the second half 34 and through the openings 70 of the tabs 66 of the female end 44 of the first half 32. The threaded portion 72 of the first attachment screw 58 may then be extended into the attachment tab 74 of the underlying electrical box 12, attaching the electrical box extender 14 to the underlying electrical box 12. The first and second halves 32, 34 may then be pivoted about the first attachment screw 58 to enclose any wires extending from the underlying electrical box 12 to the electrical device. Once the male end 42 of the first half 32 is positioned in the female end 44 of the second half 34, the second attachment screw may then be used to attach the first and second halves 32, 34 at the second attachment corner 56, and to further attach the electrical box extender 14 to the underlying electrical box 12. Finally, the electrical device 12 may be attached to the outer tabs 60, 62 of the electrical box extender 14, with any electrical connections made through the underlying electrical box 12 to the electrical device remaining intact.

An electrical box extender in accordance with certain exemplary embodiments of the present disclosure may allow for easier and more efficient attachment to an underlying electrical box. More particularly, given the modular configuration of the electrical box extender, the electrical box extender may be installed without requiring outside electrical wires to be disconnected from any electrical devices previously attached to the underlying electrical box, which may be connected to one or more electrical wires extending through the underlying electrical box. For example, an electrical box extender in accordance with aspects of the present disclosure may allow for an outside network connection line to remain connected with a network connection device connected to network connection lines extending through the underlying electrical box when the electrical box extender is attached to the underlying electrical box.

Moreover, as the first half may be interchangeable with the second half, a user of an electrical box extender in accordance with aspects of the present disclosure (such as an electrician) may interchange components from different sets of electrical box extenders in the field. Furthermore, given the attachment configuration of the first half to the second half, once installed, the electrical box extender may be reopened by a user to allow for easy access to the electrical wires positioned therein, without disconnecting any electrical connections. For example, in certain embodiments, one of the first attachment screw or second attachment screw connecting the first half to the second half at one of the first attachment corner or second attachment corner may be removed and the electrical box extender may be opened up like a clam to expose electrical wires positioned therein.

Figure 6:
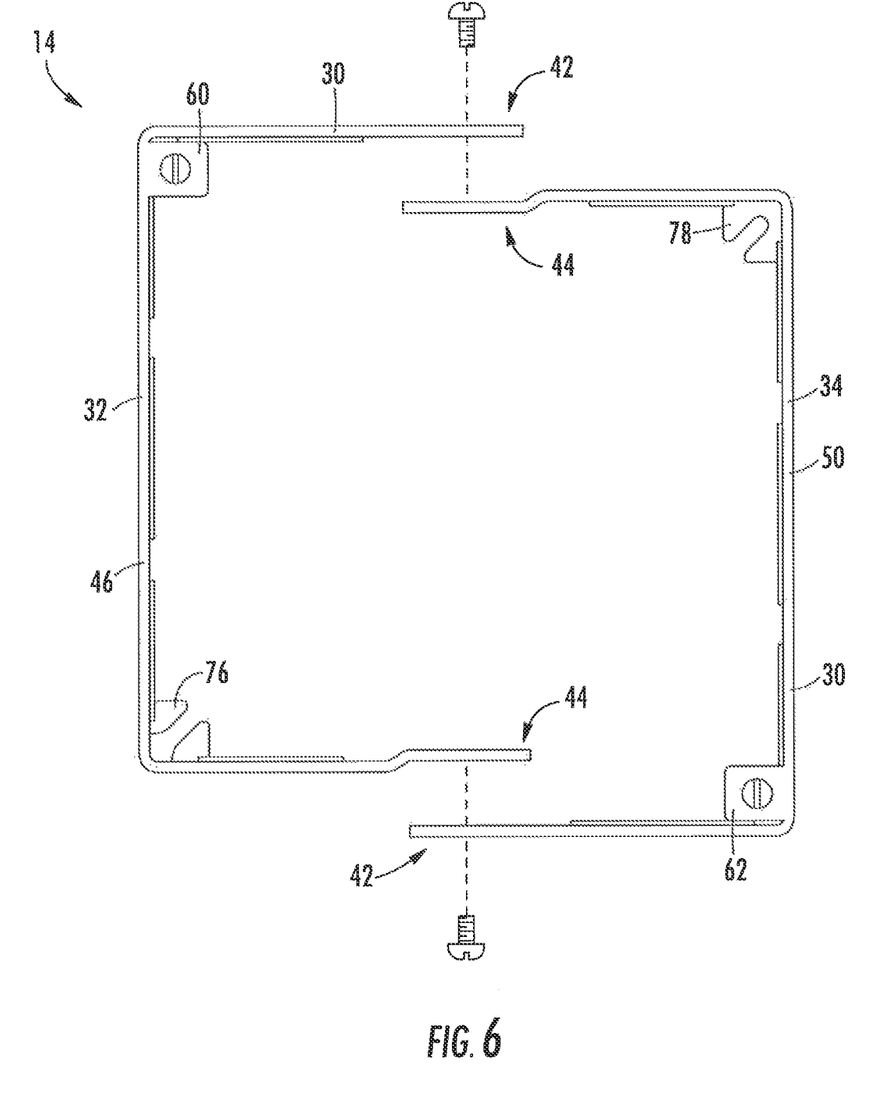
FIG. 6 is a top, exploded view of an electrical box extender in accordance with another exemplary embodiment of the present disclosure.

It should be appreciated, however, that in other embodiments, the exemplary electrical box extender 14 may have any other suitable configuration. For example, with reference now to FIGS. 6 and 7, an electrical box extender 14 in accordance with another exemplary embodiment of the present disclosure is provided. FIG. 6 provides an exploded top view of the exemplary electrical box extender 14, and FIG. 7 provides an attached top view of the exemplary electrical box extender 14.

Figure 7:
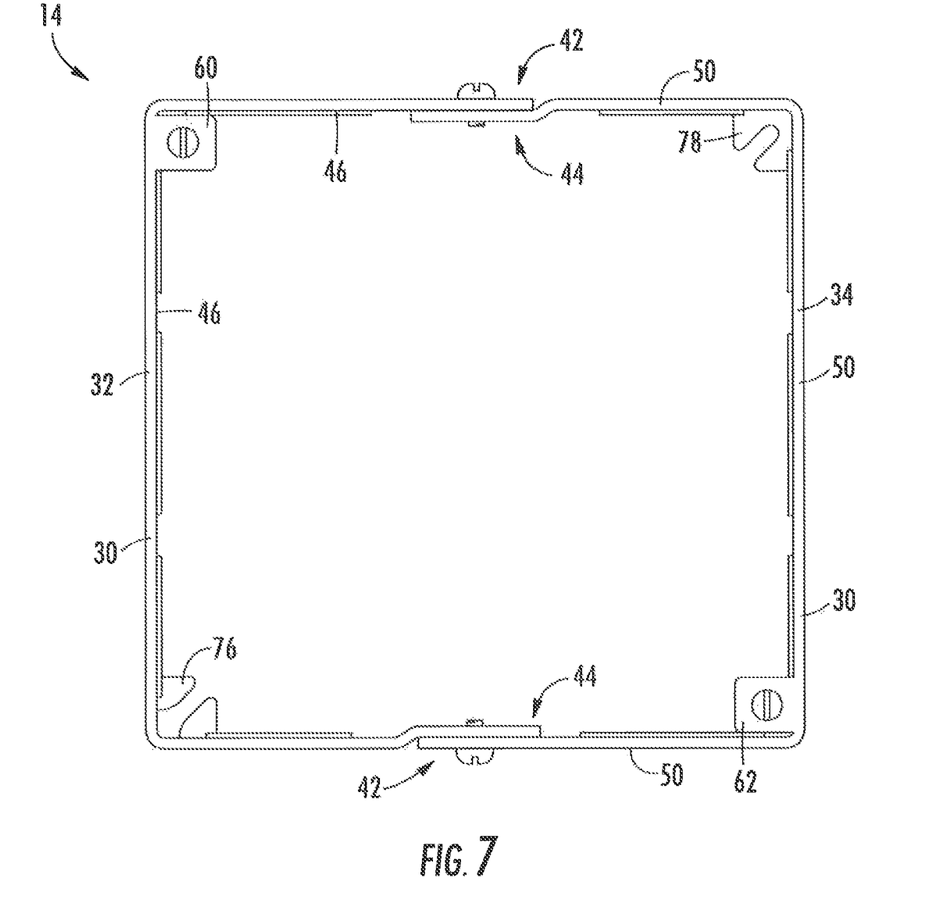
FIG. 7 is a top, attached view of the exemplary electrical box extender of FIG. 6.

The exemplary embodiment of FIGS. 6 and 7 may be configured in substantially the same manner as the exemplary embodiment discussed above with reference to FIGS. 1 through 5. Accordingly, the same or similar number designations refer to the same or similar part. For example, the exemplary embodiment of FIGS. 6 and 7 includes a first half 32 and a second half 34. The first half 32 extends between a male end 42 and a female end 44, and the second half 34 similarly extends between a male end 42 and a female end 44. The male end 42 of the first half 32 is configured for attachment to the female end 44 of the second half 34 and the female end 44 of the first half 32 is configured for attachment to the male end 42 of the second half 34. When attached, the first and second halves 32, 34 together form a polygon shape having four corners, which for the embodiment depicted is a square shape measuring approximately four inches by four inches. Additionally, for the embodiment of FIGS. 6 and 7, the first half 32 is formed integrally and is interchangeable with the second half 34, which is also formed integrally. More particularly, the first half 32 makes up about half of the electrical box extender 14, and the second half 34 also makes up about half of the electrical box extender 14. Further, for the embodiment depicted, the first half 32 has substantially the same geometry as the second half 34, such that there are substantially no differences between the first half 32 and the second half 34 other than orientation.

The exemplary embodiment of FIGS. 6 and 7 also includes an outer tab 60 extending inward from a corner at an outside edge 30 of the first half 32 and an outer tab 62 extending inward from a corner at an outside edge 30 of the second half 34. The outer tabs 60, 62 of the first and second halves 32, 34, respectively, are each configured to allow for attachment of at least one of an additional electrical box extender, a blank cover plate, or a device.

However, for the embodiment depicted, the male end 42 of the first half 32 is not attached to the female end 44 of the second half 34 to form a corner, and the female end 44 of the first half 32 is not attached to the male end 42 of the second half 34 to form a corner. Instead, the first half 32 and second half 34 are each configured in a generally C-shape, which when attached form the polygonal shape (i.e., the square). Notably, for the embodiment depicted, the male ends 42 of the first and second halves 32, 34 are each portions of a respective wall 46, 50 extending in-plane with the respective wall 46, 50. By contrast, for the embodiment depicted, the female ends of the first and second halves 32, 34 are each portions of a respective wall 46, 50 indented inward from a plane of the respective wall 46, 50. Additionally, at least one screw is provided to attach the male end 42 of the first half 32 to the female end 44 of the second half 34 and at least one screw is provided to attach the male end 42 of the second half 34 to the female end 44 of the second half 34.

Moreover, for the exemplary embodiment of FIGS. 6 and 7, the first half 32 includes an inner tab 76 extending inward from a corner at an inside edge 28 of the first half 32 and the second half 34 similarly includes an inner tab 78 extending inward from a corner at an inside edge 28 of the second half 34. The inner tabs 76, 78 of the first and second halves 32, 34, respectively, are each configured to allow for attachment of the electrical box extender 14 to an underlying electrical box 12 using a screw.

An electrical box extender in accordance such an exemplary embodiment may also allow for easier and more efficient attachment to an underlying electrical box. More particularly, given the modular configuration of the electrical box extender, the electrical box extender may be attached to the underlying electrical box without requiring outside electrical wires to be disconnected from one or more electrical devices connected to any electrical wires extending through the underlying electrical box. For example, an electrical box extender in accordance with aspects of the present disclosure may allow for an outside network connection line to remain connected with a network connection device, and for the network connection device to remain connected to network connection lines extending through the underlying electrical box when the electrical box extender is attached to the underlying electrical box. Furthermore, as the first half may be interchangeable with the second half, a user of an electrical box extender in accordance with aspects of the present disclosure (such as an electrician) may interchange components from different sets electrical box extenders in the field.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical box extender configured for attachment to an underlying electrical box, the electrical box extender comprising:
   a first half extending between a male end and a female end; and
   a second half also extending between a male end and a female end, the first and second halves together forming a polygonal shape having four corners, one corner formed where the male end of the first half is attached to the female end of the second half, and another corner formed where the male end of the second half is attached to the female end of the first half;
   wherein the male end of the second half includes a pair of tabs extending perpendicularly from a second half wall, wherein the female end of the first half includes a pair of tabs extending perpendicularly from a first half wall, and wherein the tabs of the male end of the second half are positioned inside the tabs of the female end of the first half.

2. The electrical box extender of claim 1, wherein the first half extends continuously between the male end and the female end, and wherein the second half also extends continuously between the male end and the female end.

3. The electrical box extender of claim 1, wherein the electrical box extender defines a transverse direction, wherein the male end of the first half is attached to the female end of the second half using a screw extending along the transverse direction, and wherein the male end of the second half is attached to the female end of the first half using a screw extending along the transverse direction.

4. The electrical box extender of claim 3, wherein the screw attaching the male end of the first half to the female end of the second half is configured to attach the electrical box extender to the underlying electrical box, and wherein the screw attaching the male end of the second half to the female end of the first half is also configured to attach the electrical box extender to the underlying electrical box.

5. The electrical box extender of claim 1, wherein the tabs of the male end of the second half each define an opening, wherein the tabs of the female end of the first half each define an opening, and wherein the openings in the tabs of the male end of the second half align with the openings in the tabs of the female end of the first half.

6. The electrical box extender of claim 5, wherein the electrical box extender defines a transverse direction, wherein the first and second halves each define an outer edge along the transverse direction, wherein the first and second halves further define an outer plane at the outer edges, and wherein the tabs of the female end of the first half are set back from the outer plane such that a screw extending through the openings in the tabs of the female end of the first half and the openings in the tabs of the male end of the second half does not extend into or through the outer plane.

7. The electrical box extender of claim 1, wherein the first half is formed integrally of a metal, and wherein the second half is also formed integrally of a metal.

8. The electrical box extender of claim 1, wherein the first half is interchangeable with the second half.

9. The electrical box extender of claim 1, wherein the electrical box extender defines a transverse direction, wherein the first and second halves each define an outside edge along the transverse direction, wherein the first half includes an outer tab extending inward from a corner at the outside edge of the first half, wherein the second half includes an outer tab extending inward from a corner at the outside edge of the second half, and wherein the outer tab of the first half and the outer tab of the second half are each configured to allow for attachment of at least one of an additional electrical box extender, a blank cover, or a device.

10. An electrical box assembly defining a transverse direction, the electrical box assembly comprising:
    a electrical box having a polygonal shaped configured to receive a plurality of electrical wires and configured for attachment to a wall, the electrical box defining an outer edge along the transverse direction; and
    an electrical box extender attached to the electrical box and positioned at the outer edge of the electrical box, the electrical box extender including
      a first half extending between a male end and a female end; and
      a second half also extending between a male end and a female end, the first and second halves together forming a polygonal shape substantially the same as the polygonal shape of the electrical box and having four corners, one corner formed where the male end of the first half is attached to the female end of the second half, and another corner formed where the male end of the second half is attached to the female end of the first half;
      wherein the male end of the second half includes a pair of tabs extending perpendicularly from a second half wall, wherein the female end of the first half includes a pair of tabs extending perpendicularly from a first half wall, and wherein the tabs of the male end of the second half are positioned inside the tabs of the female end of the first half.

11. The electrical box assembly of claim 10, wherein the male end of the first half is attached to the female end of the second half using a screw extending along the transverse direction, and wherein the male end of the second half is attached to the female end of the first half using a screw extending along the transverse direction.

12. The electrical box assembly of claim 11, wherein the screw attaching the male end of the first half to the female end of the second half is configured to attach the electrical box extender to the electrical box, and wherein the screw attaching the male end of the second half to the female end of the first half is also configured to attach the electrical box extender to the electrical box.

13. The electrical box assembly of claim 10, wherein the tabs of the male end of the second half each define an opening, wherein the tabs of the female end of the first half each define an opening, and wherein the openings in the tabs of the male end of the second half align with the openings in the tabs of the female end of the first half.

14. The electrical box assembly of claim 13, wherein the first and second halves each define an outer edge along the transverse directions, wherein the first and second halves further define an outer plane at the outer edges, and wherein the tabs of the female end of the first half are set back from the outer plane such that a screw extending through the openings in the tabs of the female end of the first half and the openings in the tabs of the male end of the second half does not extend into or through the outer plane.

15. The electrical box assembly of claim 10, wherein the first half is formed integrally of a metal, and wherein the second half is also formed integrally of a metal.

16. The electrical box assembly of claim 10, wherein the first half extends continuously between the male end and the female end, and wherein the second half also extends continuously between the male end and the female end.

17. The electrical box assembly of claim 10, wherein the first half is interchangeable with the second half.

18. An electrical box extender defining a transverse direction and configured for attachment to an underlying electrical box, the electrical box extender comprising:
   a first half formed integrally of metal and extending continuously between a male end and a female end; and
   a second half interchangeable with the first half and also formed integrally of metal and extending continuously between a male end and a female end, the first and second halves together forming a polygonal shape having four corners, one corner formed where the male end of the first half is attached to the female end of the second half by a screw extending along the transverse direction, and another corner formed where the male end of the second half is attached to the female end of the first half by a screw extending along the transverse direction, the screw attaching the male end of the first half to the female end of the second half and the screw attaching the male end of the second half to the female end of the first half each configured to attach the electrical box extender to the underlying electrical box;
   wherein the male end of the second half includes a pair of tabs extending perpendicularly from a second half wall, wherein the female end of the first half includes a pair of tabs extending perpendicularly from a first half wall, and wherein the tabs of the male end of the second half are positioned inside the tabs of the female end of the first half.

* * * * *